United States Patent [19]

Schade et al.

[11] 4,330,455
[45] May 18, 1982

[54] METHOD OF PREPARING DISPERSIONS OF CRYSTALLIZABLE POLYESTERS OF HIGH MOLECULAR WEIGHT

[75] Inventors: Gerhard Schade, Witten; Robert Kühnrich, Oer-Erkenschwic, both of Fed. Rep. of Germany

[73] Assignee: Dynamit Nobel Aktiengesellschaft, Troisdorf, Fed. Rep. of Germany

[21] Appl. No.: 192,764

[22] Filed: Oct. 1, 1980

[30] Foreign Application Priority Data

Oct. 3, 1979 [DE] Fed. Rep. of Germany ....... 2940072

[51] Int. Cl.$^3$ ................................................ C08K 5/01
[52] U.S. Cl. ..................................... 523/312; 524/605
[58] Field of Search ............. 260/31.2 XA, 31.8 XA, 260/33.6 R, 34.2

[56] References Cited

U.S. PATENT DOCUMENTS

| | | | |
|---|---|---|---|
| 3,793,245 | 2/1974 | Clarke | 260/33.6 R |
| 3,935,155 | 1/1976 | Osmond | 260/33.6 R |
| 4,059,557 | 11/1977 | Bentley | 260/33.6 R |
| 4,102,846 | 7/1978 | Bentley | 260/34.2 |

*Primary Examiner*—Paul R. Michl
*Attorney, Agent, or Firm*—Sprung, Horn, Kramer & Woods

[57] ABSTRACT

A method of preparing a dispersion of a crystalline linear saturated polyester of high molecular weight which comprises contacting said polyester with a high boiling organic liquid whose boiling point is at or above the melting point of the polyester, the weight ratio of polyester to high boiling organic liquid being between 40:60 and 60:40 and heating the resultant mixture at elevated temperature until a homogeneous mass forms, cooling the resultant mass with stirring too such an extent that the melt material is still able to flow or be stirred and then allowing the material to further cool and stiffen without further stirring; or before or during further cooling diluting the mixture while it is still capable of flowing or being stirred, with an additional amount of a high boiling organic liquid or a liquid miscible therewith and thereafter further cooling the resultant mixture.

7 Claims, No Drawings

METHOD OF PREPARING DISPERSIONS OF CRYSTALLIZABLE POLYESTERS OF HIGH MOLECULAR WEIGHT

BACKGROUND

1. Field of the Invention

The invention concerns the preparation of dispersions of polyesters of high molecular weight which have a crystalline or partially crystalline character due to the arrangement of the polyester chains.

2. Discussion of Prior Art

Nonaqueous dispersions of polymers have long been known. They are described, for example, in a review by R. Dowbenko and D. P. Hart, "Nonaqueous Dispersions as Vehicles for Polymer Coatings," Ind. Eng. Prod. Res. Develop., Vol. 12, No. 1, 1973, pp. 14–28. These dispersions are always prepared by the polymerization of monomers containing olefinic double bonds, with the aid of liquids which dissolve the monomers but not the polymers. Such a method, however, is not applicable when the monomers, which are already dispersed, are to be reacted to a high molecular weight, not by polymerization but by thermal polycondensation.

For the purpose of converting highly polymerized substances into dispersions, it has already been proposed to dissolve especially polyethylene or ethylene copolymers in a suitable liquid with the application of heat, and to reprecipitate them by cooling, thereby obtaining relatively fine powder after filtration (French Pat. No. 945,962). If the cooling takes place very rapidly and the concentration of the polymer amounts to no more than 8% and 5%, respectively, very finely divided, stable dispersions are obtained (German Offenlegungsschrift No. 2,814,030).

This last-named method has the disadvantages that expensive apparatus are required for the purpose of the very rapid cooling, and that dispersions can be obtained having only an extremely low solids content, the use of which is uneconomical.

When the polymers that are to be dispersed are brittle hard resins, it is also possible to make them dispersible by mechanical comminution (cf., for example, German Offenlegungsschrift No. 2,210,484). In the case of high polymers, the achievement of the required degree of fineness by grinding is generally impossible, even when the material is chilled with liquid nitrogen, or else it can be accomplished, at hardly acceptable expense, by sifting the resin and constantly recycling the particles that are still not sufficient.

It is furthermore known that amorphous polyesters of high molecular weight in combination with suitable triazine resins, dissolved in suitable varnish solvents, will, upon being baked onto sheet metals, yield sterilizable coatings (German Offenlegungsschrifts Nos. 1,807,776 and 2,126,048). This sterilizability, however, is generally satisfactory only if pure water is used as the sterilizing liquid. If the water used as the sterilizing liquid, however, contains additive acids used in foods, such as lactic acid, citric acid, tartaric acid or acetic acid, the coatings may no longer be sufficiently stable during sterilization.

In contrast to the amorphous polyesters used exclusively in accordance with German Offenlegungsschrift Nos. 1,807,776 and 2,126,048 for reasons of solubility, crystalline polyesters, such as those described for example in German Auslegeschrift No. 2,346,559, yield coatings of far superior sterilizability.

These crystalline polyesters, however, due to their basically irremediable insolubility in conventional varnish solvents such as esters, alcohols, ketones and hydrocarbons, have not been able to be used heretofore as varnish raw materials, and they are used for surface coating only by the known powder melting methods, especially fluidized bed sintering methods or the electrostatic powder spraying method. These methods, however, are not applicable in all cases, and this is particularly disadvantageous if it is desired to take advantage of their superior sterilizability, as for example in the lining of food cans or in the coating of sheet metal from which food cans are to be manufactured.

SUMMARY OF THE INVENTION

It is, therefore, an object of the invention to transform crystallizable polyesters of high molecular weight to dispersions which can be applied by the conventional methods of wet varnishing, and can then be baked on to create sterilizable coatings.

The method of attaining this object comprises heating crystallizable polyesters of high molecular weight, in a high-boiling organic liquid whose boiling point is at or above the melting point of the polyesters, the weight ratio of polyester to the high-boiling liquid amounting to between about 60:40 and 40:60, preferably from 55:45 to 45:55, to a temperature that is equal to or greater than the melting point of the polyester, which can be lowered in some cases by softening the polyester with the high-boiling liquid but is lower than the boiling temperature of the high-boiling liquid, until a homogeneous phase has developed; cooling the homogeneous phase until a temperature is reached at which the mixture, which meantime is becoming heterogeneous, is still easily stirrable or capable of flowing, and cooling, with stirring, to the extent that the material is still stirrable or capable of flowing, and then either (A) letting the material cool and thicken without further stirring, or (B), before or during further cooling, diluting the still stirrable or flowable material by stirring it with additional amounts of the high-boiling organic liquids or liquids miscible therewith, with the use, if desired, of known dispersing apparatus.

The still stirrable or flowable mixture generally has a temperature between 100° and 150° C., especially 100° to 120° C., but in special cases its temperature may be lower or higher than that.

The mixture that is cooling is solidifying in accordance with method A generally does not need to be stirred any further and it hardens to masses of a dough-like, wax-like or glue-like consistency. It is then, however, generally necessary during the further dilution to break up, by means of known dispersing apparatus, the secondary agglomerates forming in the cooled mass.

In many cases, therefore, method B is preferred, since the still hot and unsolidified mass is made easier to manage by dilution, and consequently more stable finished mixtures are obtained, or mixtures which are to be further diluted to the dispersions ready for application.

The still stirrable or flowable product that primarily develops is generally a turbid fluid, and surprisingly contains particles of an average diameter of five microns or less, so that an important part of the task of converting the polyester to a dispersible state is accomplished.

The amount of high-boiling organic liquids for the formation of the homogeneous, stirrable, hot mixture should not be substantially greater or less than the above-stated ratios to the polyester, since otherwise the above-specified particle fineness is usually lost.

The additional amount of high-boiling organic fluids to be added in accordance with method B, however, is not critical, although it should suffice to maintain the stirrability of the polyester dispersion at the particular temperature involved, so that, for the preparation of the primary product and the product of method B, a total of about 100 to 400 parts by weight of high-boiling liquid are used for every hundred parts by weight of polyester.

The same amounts are involved when, in accordance with method b, a liquid that is miscible with the high-boiling organic liquid is used, and also in the case of the dilution of cooled masses in accordance with process claim 2.

The miscible liquids in method B, and the liquids used for any further dilution are generally organic solvents which can then be solvents of any desired nature, although they must be compatible with the high-boiling organic liquids.

The different kinds of such solutions and diluents are very numerous and are known in themselves, for example from the "Lackrohstoff-Tabelle" (table of varnish and lacquer raw materials) by E. Karsten when is cited below and specifically incorporated herein by reference. The substances named in the examples do not constitute an exhaustive enumeration by any means.

The dispersing apparatus to be used, if desired, in accordance with embodiment B during the further dilution of the cooled masses, are apparatuses known in the varnish industry, which use a high rotatory speed to bring about the distribution of dispersible particles to form stable dispersions and to break up secondary agglomerates. Preferred in this case are apparatus which produce turbulence or a shearing or cutting or comminuting action, which is enhanced, if desired, by a pumping action or cutting, shearing or rotating tools contained within a tube.

Particularly suitable are, for example, dissolvers having disks, circular sawblades or knives disposed on a shaft driven by a high-speed motor, and also Ultra-Turrax ® stirrers and similar apparatus.

The crystallizable polyesters of high molecular weight are generally to be partially crystalline polyesters which have a definite melting point within a narrow temperature range of a few degrees Celsius. The melting points of these crystallizable polyesters are generally to be not lower than about 110° C., preferably above 125° C., and only in exceptional cases above 200° C. Preferably the melting points of the polyesters are between 130° and 180° C., and very preferably between 150° and 170° C.

The polyesters used in the method of this invention have melting points within a range of no more than 220° Celsius, preferably no more than 180° Celsius. These polyesters have molecular weight of at least 10.000 and preferably at least 12.000. The molecular weight can be up to 25.000, these values being determined by relative viscosities of about 1,35 to about 1,75 or higher as measured in a mixture of 60 wt.-% of phenol and 40 wt.-% of sym.tetrachlorethane in a solution of 1 g in 100 ml of the mixture at 25° Celsius.

If the coatings made from the polyester dispersions are required to be sterilizable, the melting point of the polyesters must be above the sterilizing temperature, which is to amount to 121° C., although it can also be 130° C. and in special cases even more.

The glass transition temperature of the polyesters is to be between 15° and about 35° C., preferably in the room-temperature range of 20° to 30° C.

With regard to their material composition, the polyesters are those on the basis of aromatic dicarboxylic acids, especially terephthalic and/or isophthalic acid on the one hand, and of diols of 2 to 12 carbon atoms, especially unbranched diols, on the other, provided that they are crystallizable polyesters, and that the requirements as regards melting temperature and glass transition temperature are fulfilled.

Preferred are polyesters having contents of only or predominantly terephthalic acid and tetramethylene glycol, and, if desired, up to 50% by weight of additional polyester-forming derivatives. Such polyesters are described in German Auslegeschrift No. 2,346,559 and U.S. Pat. No. 4,102,363 and U.S. Pat. No. 4,054,681, the disclosures of which are hereby incorporated specifically herein by reference.

Greatly preferred are polyesters on a basis of terephthalic acid, containing from 0 to 50 mole-% of isophthalic acid on the one hand and tetramethylene glycol on the other, whose glass temperature of about 30° C. should be lowered slightly by the co-condensation of small amounts of aliphatic dicarboxylic acids and/or long-chain diols of 6 to 12 carbon atoms, in amounts of up to 10 mole-% of one of these classes of monomers. Polyesters of different composition which also substantially satisfy these requirements as regards melting point and glass transition temperature, are not, however, to be excluded.

The relative viscosities of these polyesters (measured in a concentration of 1 gram of polymer in 100 ml of solution, the solvent consisting of 60 wt.-% of phenol and 40 wt.-% of 1,1,2,2-tetrachloroethane, at 25° C.) should be between 1.35 and 1.75, preferably between about 1.4 and 1.7, i.e., in a range in which the thermoplastic properties of these products are just fully developed. Polyesters of excessively high molecular weight often result in leveling problems when the dispersions are applied, or in coatings which are not sufficiently smooth after baking.

Products of a lower relative viscosity are more difficult to manage, but fundamentally they are not be be excluded.

The high-boiling organic liquids are generally not able to dissolve the crystallizable polyester at room temperature, but are able to dissolve the polyester at temperatures above the melting point of the polyesters and thus form homogeneous mixtures.

The high-boiling organic liquids can be any of the products which are listed in Section 72.4 of "Lackrohstoff-Tabelle" ["table of varnish raw materials"] by E. Karsten, Vincenzt-Verlag, Hannover, Federal Republic of Germany, provided that they fulfill the requirement that their boiling point is at least as high as the melting point of the polyesters to be dispersed, i.e., generally above 160° to 170° C., preferably above 180° C., and, in the case of high-melting polyesters, above 200° C.

The high-boiling organic liquids are particularly mixtures of alkyl aromatic compounds, such as for example Solvesso ® 100, 150, and 200 of ESSO Chemie, or Shellsol ® AB, E, N and RA, and they contain 90 to 99 weight-percent of alkyl aromatic compounds, especially high percentages of various alkylbenzenes having a plurality of methyl and/or ethyl groups, predominantly alkylbenzenes of ten carbon atoms. However, other high-boiling organic liquids can be used, alone or in mixture with those named above, provided that the polyesters are soluble therein at higher temperatures and the boiling points are above the melting points of the polyesters.

In the case of alkyl aromatics the alkyl group can contain up to 18 carbon atoms, preferably up to 8 carbon atoms while the aromatic group can have up to 18 carbocylic carbon atoms. Preferably, the aromatic group is phenyl or naphthyl.

It is desirable to add suitable thickening agents to the high-boiling organic liquids before or after the dispersal of the polyesters, so as to prevent the premature settling of the polyester particles and/or of any pigments that may be added. Such thickening agents can also be found listed in the "tables of varnish raw materials" previously mentioned.

Since it has been found desirable to perform the baking-on of the dispersions in the presence of etherified triazine resins, it is often sufficient to use such triazine resins for the preparation of paste from the pigments and for the thickening of the alkyl aromatic compounds.

Other additives, such as leveling agents, dyes, pigments crosslinking agents, hardening catalysts, and resins which are soluble in the solvents used, such as ester resins for example, can be added to the dispersions before, during or after their preparation.

In general, the polyester contents of the ready-to-apply dispersions are to be from 25 to 35% by weight.

The preparations that can be made with these dispersions can serve especially for the production of heat-resistant, tightly adherent coatings on metals. The dispersions can be used to special advantage for the internal coating of food cans, since the finished coatings are stable at the temperatures commonly used for the sterilization of foods, and they are not attacked by the flavoring acids and salts contained in the canned foods.

In carrying out embodiment A the polyester-organic liquid mixture is cooled with stirring down to a temperature of between 130° and 70° C. Thereafter stirring is stopped and the mixture is further cooled. The further cooling can be conducted at a temperature rate of between 10° and 0.1° C./sec, preferably between 1° and 0.1° C./sec.

In carrying out embodiment B the polyester-organic liquid mixture can be cooled with stirring down to a temperature of between 130° and 70° C. Thereafter further cooling with stirring can be effected by the addition, either before or during the further cooling, of additional amount of high boiling liquid or a liquid miscible with the high boiling liquid initially employed. These additional liquid or liquids can themselves be at a temperature of between 130° and 0° C. They can be added in an amount of between 50 and 250 parts by weight, preferably between 100 and 200 parts by weight per 100 parts by weight of polyester present in the initial polyester-organic liquid mixture. The additional liquids can be added to effect a cooling rate of between 10° and 0.1° C./sec, preferably between 5° and 0.1° C./sec.

The diluting organic liquids which can be used in the embodiment B in the case of the high boiling organic liquids are the same as noted above i.e. particularly the noted mixtures of alkyl aromatic compounds, and in the case of liquids miscible therewith, will say with said high boiling organic liquids, are usual solvents which include: aliphatic, cycloaliphatic, aromatic hydrocarbons, such as white spirit, tetra- and hexahydronaphthalene, decahydronaphthalene, toluene, the xylenes, solvent naphtha and mixtures thereof; alcohols and esters, such as butyl alcohol, methyl ethyl carbinol, trimethylcarbinol, 2-ethyl hexanol, decanol, nonanol, propane diol, methoxy butanol, ethyl-, butyl-, methyl glycol acetat, butyl-, 2-ethyl-hexyl-, isopropyl-, n-propyl acetat, diethylcarbonat, amyl acetate, methyl-, ethyl-, propyl-, butyl glycol and similar alcohols and esters; ketones, such as cyclohexanone, isophorone, methyl ethyl ketone, methyl propyl ketone, methyl isobutyl ketone, mixtures containing any of these fluids.

EXAMPLES

All of the amounts given in the examples are parts by weight of the total mixture.

EXAMPLE 1

60.8 Parts of dimethylterephthalate and 59 parts of tetramethylene glycol were transesterified in the presence of 0.03 parts of tetrabutyltitanate under high-purity nitrogen, with stirring, at temperatures up to 185° C., until the production of methanol had ceased. Then, against a strong stream of nitrogen, 22.7 parts of isophthalic acid and 3.0 parts of azelaic acid were added and the reaction was continued initially at standard pressure and then at a vacuum of approximately 50 Torr at 180° to 220° C., until no more water of reaction and no more free tetramethylene glycol passed over. Then the temperature was raised to 250° C. and the vacuum to 0.5 to 0.1 Torr. Under these final conditions, stirring was continued for two more hours, and then the vacuum was broken with nitrogen and the polyester melt was poured out. The product had a melting point (melting maximum according to DSC) of 173° C., a glass transition temperature range (according to DSC=differential scanning calorimetry) of 21° to 30° C., and a relative viscosity in solution (1% polymer in 100 ml of solution; solvent: mixture of 60 weight-parts of phenol and 40 weight-parts of tetrachloroethane, measuring temperature 25° C.) of 1.44.

50 Weight-parts of this polyester were heated with stirring at 170° C., in 50 parts of SOLVESSO ® 150, a mixture of alkyl aromatics sold by ESSO AG and having a boiling range of 186°–212° C., until a clear, homogeneous liquid had formed. Then the heat source was removed and the mixture was allowed to cool gradually with stirring down to a temperature of 120° C. During the cooling, an increasing turbidity took place due to the crystallization of the polyester. At 120° C., however, the mass still had good flowing ability.

This mass was poured out, and it stiffened to a mass which could be spread and distributed with spoons and spatulas and the like.

200 Parts of this composition, containing 100 parts of polyester, were stirred in a dissolver with 30 parts of hexamethoxymethylamine (95% solution, Maprenal MF 900 made by Cassella) and 200 parts of Solvesso 150, until virtually no particles of a diameter greater than 5 microns could be found with a microscope (approx. 20 minutes with external cooling). A very fluid dispersion was obtained, having a solid content of about 30%. This dispersion was baked onto tinplate at 210° C. for 10 minutes to a dry film thickness of about 10 microns, resulting in a very glossy clear varnish film.

The tinplate pieces thus coated were sterilized for 1 hour at 121° C. in:

(a) 1% aqueous lactic acid solution, in one case, (b) aqueous 3% sodium chloride solution plus 2% acetic acid solution in another, and
(c) aqueous 0.5% citric acid plus 1% tartaric acid solution in the third case.

The coatings were left entirely intact by this treatment, while coatings prepared in accordance with German Offenlegungsschrift No. 1,807,776 and German Offenlegungsschrift No. 2,126,048, from one of a total of 3 differently composed but amorphous polyesters and from solutions instead of dispersions, were all dulled by this sterilization test and in some cases they were made rough or full of bubbles.

EXAMPLE 2

Example 1 was repeated in the same manner, except that another 100 weight-parts of Solvesso 150 were added portion by portion to the composition maintained at 120° C., over a period of about 15 minutes, and stirred in. The product obtained in this manner was poured out at a temperature of about 100° C. and allowed to cool. The result was a soft, paste-like mass having thixotropic properties. The thixotropic behavior can be substantially eliminated by the addition of less than 5 weight parts of strongly polar solvent, such as dimethylformamide, and a dispersion is obtained of an applicable consistency, which can be homogenized by the use of a dissolver to form suspensions of discrete particles of a diameter of about 5 microns.

EXAMPLE 3

100 Weight-parts of polyetramethylene terephthalate of a melting point of 225° C. and a relative solution viscosity of 1.85 (measured as in Example 1) were dissolved uniformly in 100 weight-parts of Solvesso 200, a mixture of alkyl aromatic compounds with a boiling range of 236°–290° C., at 210° C., and cooled to 150° C., at which temperature the mass was still just stirrable. While the temperature was maintained, 200 weight-parts of ethylene glycol diacetate were gradually added with continued stirring, and then allowed to cool. After this mass had been treated with a dissolver, particle diameters of about 5 to 10 microns were obtained. It was possible to replace the ethylene glycol diacetate with the same amounts of 1,2-propylene glycol, 3-methoxybutylacetate, butyldiglycol and isophorone, without thereby perceptibly affecting the particle diameter.

EXAMPLE 4 (COMPARISON)

A clear solution was prepared at 170° C. from the polyester of Example 1 with 60 weight parts of Solvesso 150 per 100 parts of polyester, and then was cooled to 150° C., at which temperature the mixture was still stirrable and flowable. Then, while maintaining the temperature, 150 weight parts (α) of additional Solvesso 150 and (β) of test benzine with a boiling range of 185°–220° C. were stirred in and the mixtures were allowed to cool. After dispersion with a dissolver and the addition of more solvent, particle diameters of about 20 microns were found which could not be further reduced by means of the dissolver. These dispersions largely settle in less than one hour and consequently cannot be used as paint raw materials.

What is claimed is:

1. A method of preparing a dispersion of a crystalline linear saturated polyester of high molecular weight which comprises contacting said polyester with a high boiling organic liquid whose boiling point is at or above the melting point of the polyester, the weight ratio of polyester to high boiling organic liquid being between 40:60 and 60:40 and heating the resultant mixture at elevated temperature until a homogeneous mass forms, cooling the resultant mass with stirring to such an extent that the melt material is still able to flow or be stirred and then:
   A. allowing the material to further cool and stiffen without further stirring; or
   B. before or during further cooling diluting the mixture while it is still capable of flowing or being stirred, with an additional amount of a high boiling organic liquid or a liquid miscible therewith and thereafter further cooling the resultant mixture.

2. A method according to claim 1, wherein the resultant mixture is cooled until a dispersion of high molecular weight polyester in said organic liquid forms.

3. A method according to claim 1, wherein the process is carried out at least partially in a dispersing apparatus.

4. A method according to claim 1, wherein the homogeneous mixture of high molecular weight polyester and organic liquid is cooled to such an extent that the material is still able to flow or be stirred and thereafter said mixture is diluted with additional high boiling organic liquid or with a liquid miscible with said high boiling organic liquid.

5. A method according to claim 1, wherein said polyester has a relative viscosity between 1.35 and 1.75.

6. A method according to claim 5, wherein the melting point of the polyester is between 110° and 200° C.

7. A method according to claim 1, wherein the organic liquid comprises an alkyl aromatic compound.

* * * * *